(12) United States Patent
Namba et al.

(10) Patent No.: US 6,501,628 B1
(45) Date of Patent: Dec. 31, 2002

(54) METHOD OF SYNCHRONOUS CIRCUIT OPENING OF GENERATOR CIRCUIT BREAKER, AND ITS CONTROL APPARATUS

(75) Inventors: Shigeaki Namba, Hitachi (JP); Kengo Uda, Hitachi (JP); Masayuki Fukai, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 213 days.

(21) Appl. No.: 09/722,550

(22) Filed: Nov. 28, 2000

(30) Foreign Application Priority Data

Nov. 30, 1999 (JP) .......................... 11-339295
Jul. 6, 2000 (JP) ....................... 2000-216079

(51) Int. Cl.$^7$ .............................. H02H 7/06; H02J 3/38
(52) U.S. Cl. .............................................. 361/5; 307/43
(58) Field of Search ................................ 361/5, 20, 21, 361/52, 62, 63, 65, 153; 307/16, 20, 29, 43, 47, 57, 59, 84.87

(56) References Cited

U.S. PATENT DOCUMENTS

| | | | |
|---|---|---|---|
| 3,646,356 A | * | 2/1972 | Hoffman ...................... 307/57 |
| 4,218,718 A | * | 8/1980 | Sun .............................. 361/113 |
| 4,710,844 A | * | 12/1987 | Scott et al. ................. 361/93.2 |
| 5,424,894 A | * | 6/1995 | Briscall et al. ............... 361/45 |
| 5,475,558 A | * | 12/1995 | Barjonnet et al. ............ 361/64 |

FOREIGN PATENT DOCUMENTS

| | | |
|---|---|---|
| JP | 60-189124 | 9/1985 |
| JP | 7-274380 | 10/1995 |

OTHER PUBLICATIONS

Electrical Society Report of Year 1999 10th Power & Energy Group Conference No. 464.
Collection of Papers (Part B): Electric Power Devices & Phenomena—B18 Circuit Breaker No. 464. 7–274380(1–5) 60–189129 (109–112).

* cited by examiner

*Primary Examiner*—Brian Sircus
*Assistant Examiner*—Boris Benenson
(74) *Attorney, Agent, or Firm*—Mattingly, Stanger & Malur, P.C.

(57) ABSTRACT

To provide a method of synchronous circuit opening of generator circuit breaker and its control apparatus that can protect a sound generator system of a generator main circuit from a phenomenon that current may not pass through current zero for many cycles.

There is provided a construction where a generator exciting current control is incorporated into a control mechanism. In case that an occurrence possibility of a phenomenon that current may not pass through current zero for many cycles can be anticipated, time delay is intentionally caused by timer so as to prevent synchronism of the phenomenon, using an output signal of a generator lock-out relay which covers individual element of an electrical fault causing the phenomenon or in which circuit all those elements are integrated. In case that the phenomenon can be anticipated by calculation, a reactive power output of a generator is increased and consequently AC current amplitude of a sound generator is increased so as to eliminate the phenomenon.

15 Claims, 9 Drawing Sheets

T1 : ACCORDING TO TIMER SETTING TIME

: LOGIC SYMBOL (OR)

: ONE-SHOT TIMER

: FUNCTION FOR OUTPUTTING ON SIGNAL FOR A LENGTH OF TIME "t"

: LOGIC SYMBOL (NOT)

: LOGIC SYMBOL (AND)

GENERATION OF AVR CONTROL COMMAND SIGNAL
(CONCEPTION OF TRANSFER FUNCTION)

GENERATION OF AVR+PSVR CONTROL COMMAND SIGNAL
(CONCEPTION OF TRANSFER FUNCTION)

GENERAL AUTOMATIC REACTIVE POWER
ADJUSTING APPARATUS
(REACTIVE POWER MANAGEMENT FLOW)

WHEN $XC_3 \neq 0$

COMMAND VALUE FOR EACH OUTPUT X1, X2, X3, AND X4 IS DETERMINED SO AS TO ACHIEVE SPECIFIED XC1 AND XC3 (=XC2).

- REACTIVE POWER FLOW -

(CONDITION 1) $XC_1 + XC_3 = X_1, X_2, X_3$ (CONDITION 2) $XC_2 - XC_3 = X_4$

METHOD OF SYNCHRONOUS CIRCUIT OPENING OF GENERATOR CIRCUIT BREAKER, AND ITS CONTROL APPARATUS

BACKGROUND OF THE INVENTION

The present invention relates to a method of and a control apparatus for opening circuit breakers synchronously in a generator main circuit comprising multiple generator systems.

According to the latest knowledge in the Electrical Society Report of Year 1999 "10th Power & Energy Group Conference—Collection of Papers (Part B): Electric Power Devices & Phenomena—B18 Circuit Breaker No. 464", it is reported that, when a short-circuit fault occurs and current waveform at a part of a power line construction having branch circuits (a construction having branches electrically) is observed (by calculation and analysis), a phenomenon of no current through current zero has occurred in an actual power system.

This report not only makes clear the occurrence mechanism of the phenomenon but also suggests countermeasures in an actual operation. For example, since the phenomenon of no current through current zero is likely to occur inevitably as a combined system characteristic of the characteristics of each electrical component, resulting from the plan and design of a power supply system, it is proposed to plan to coordinate the timing for turning off (opening synchronously) the AC circuit breakers on the power line on a precondition of occurrence of the phenomenon.

If a zero-less phenomenon occurs in a faulty current when a bypass protection failure signal is transferred from a means for judging whether a bypass protection device of a series compensator functions wrongly or will not function properly to a protection device for operating a circuit breaker, there is available a technique as disclosed in Japanese Patent Application Laid-Open No. 7-274380 (1995), which is a method for protecting a series compensating system from faults by controlling a circuit breaker so that a protection relay sends out a trip signal of the circuit breaker just in time for the timing when the zero-less phenomenon disappears. There is available another technique as disclosed in Japanese Patent Application Laid-Open No. 60-189124 (1985), which is a method that a resistance for inhibiting occurrence of the phenomenon of no current through current zero in an accidental current is provided in the generator main circuit so as to quicken the attenuation of DC component of the current sent out from a generator and allows the current to pass through current zero.

Although the above paper proposes a conception of countermeasures for preventing the phenomenon of no current through current zero, however, no concrete measures in practical operation is proposed.

Further, Japanese Patent Application Laid-Open Nos. 7-274380 (1995) and 60-189124 (1985) disclose measures against the phenomenon of no current through current zero as described above, but do not consider the following. That is, if a phenomenon of no current through current zero for many cycles occurs in a generation and transmission system, wherein multiple generator systems (group) are connected to a large-capacity system and these generator systems are operated in parallel, because a fault such as malfunction or grounding failure occurs in any one of the multiple generator systems, and even when circuit breakers of other sound generator systems are attempted to be shut down, it is likely to happen that the current not passing through current zero cannot be shut down and hence the generator main circuit cannot be protected surely due to this phenomenon of no current through current zero. The above Publications do not give any consideration to this point.

An object of the present invention is to provide a method of and a control apparatus for synchronous circuit opening of generator circuit breaker so as to be able to protect a generator main circuit from a phenomenon of no current through current zero at the time of the synchronous circuit opening of a circuit breaker of a sound generator system.

In order to achieve the above object, the present invention provides a method of synchronous circuit opening of a generator circuit breaker for a generator main circuit in which multiple generators are connected to a transmission system via circuit breakers so that a circuit breaker can be closed or opened synchronously; wherein, at the time when a circuit breaker installed in a generator main circuit is to be opened synchronously, if an electric signal for judging occurrence of an electrical fault in other generator main circuit is detected, opening of the circuit breaker synchronously is suspended for a specified length of time after the electric signal is detected.

The present invention also provides a method of synchronous circuit opening of a generator circuit breaker for a generator main circuit in which multiple generators are connected to a transmission system via circuit breakers so that a circuit breaker can be closed or opened synchronously; wherein, at the time when a circuit breaker installed in a generator main circuit is to be opened synchronously, the amplitude of AC current waveform of the generator output is amplified before the circuit breaker is opened synchronously so that the AC current reaches current zero, and then the circuit breaker is opened synchronously.

Besides, in order to achieve the above object, the present invention provides a control apparatus for synchronous circuit opening of a generator circuit breaker for a generator main circuit comprising multiple generator systems in which a generator is connected to a transmission system via circuit breakers; said multiple generator systems comprising a detecting apparatus for detecting occurrence of an electrical fault and a protection relay for shutting down the circuit breakers in case of an electrical fault; wherein, said control apparatus for synchronous circuit opening is provided with an interlock circuit which, at the time when a synchronous circuit opening command signal of a circuit breaker installed in a generator system is to be output, if an actuation signal of a protection relay installed in other generator system is output, suspends output of the synchronous circuit opening command signal for a specified length of time after the actuation signal is output.

The present invention also provides a control apparatus for synchronous circuit opening of a generator circuit breaker for a generator main circuit comprising multiple generator systems in which a generator is connected to a transmission system via circuit breakers; wherein at the time when a circuit breaker of a generator system to be opened of its circuit synchronously out of the multiple generator systems is to be opened synchronously, the amplitude of AC current waveform of the generator output is amplified by said control apparatus for synchronous circuit opening before the circuit breaker is opened synchronously so that the AC current reaches current zero, and then the circuit breaker is opened synchronously.

DETAILED DESCRIPTION OF THE PREFERRED EMBODIMENTS

Figure 1:
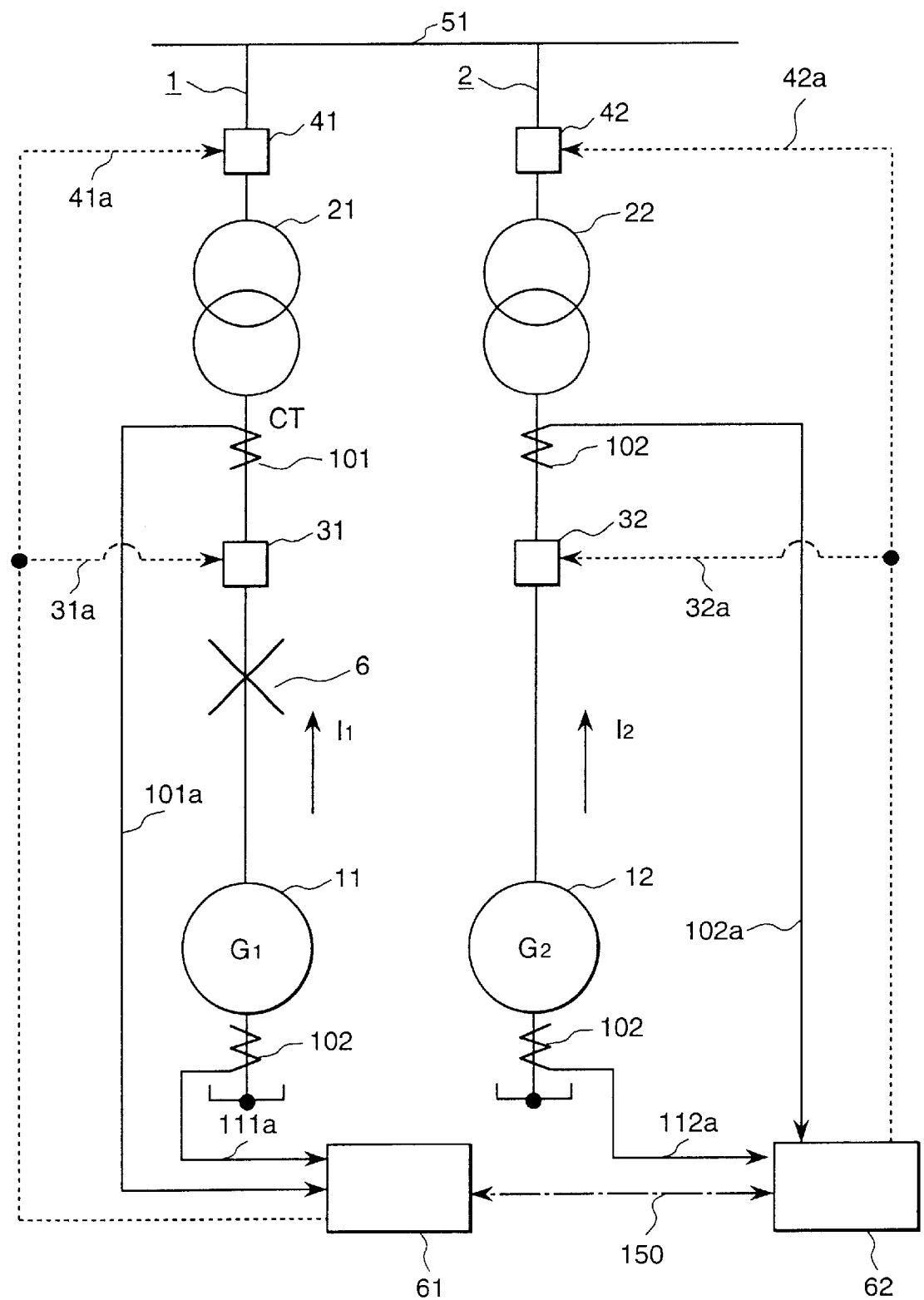
FIG. 1 is a diagram of a control and protection unit of a generator main circuit according to an embodiment of the present invention.

This embodiment relates to individual control method and control apparatus of each generator that is operated in the generation and transmission system of a normal power station wherein multiple generators are connected to a transmission line or in the system among multiple power stations of which electrical variation gives impact on each other, and particularly relates to an operation for opening the circuit of a generator synchronously by opening the circuit breaker of the circuit having the same potential as the generator voltage of the generator main circuit. In addition, this embodiment is applicable to any power station, irrespective of the type of prime mover system such as thermal or nuclear system, provided that the features and specific system characteristics of electrical circuit condition are the same.

In the present operation of a generator circuit breaker or generator load-break switch, according to the operation record of domestic regional power utilities in Japan, for example, it is a normal practice that, in order to open the circuit of a generator of a power station synchronously, electrical output (effective power) of the generator is first reduced gradually to sufficiently minimize the load so as not to give sudden impact from the generator on the boiler, turbine, gas turbine, and other components on the prime mover side, and then the generator circuit breaker is opened synchronously. A power plant is generally so designed that devices and components should not be damaged even if the plant is subjected to so-called "load shut-down" operation, a sudden change in operation from a big load to zero load. This operation, however, is not employed normally because frequent load shut-down accelerates deterioration of devices and components.

Now, technical problems concerning the phenomenon of no current through current zero are clarified hereunder.

Occurrence of the phenomenon of no current through current zero in the generator main circuit results in a problem particularly in a combined-cycle power plant of the latest. (It is not always true to say that the phenomenon does not occur in a steam power plant.) Although the output of individual machine in a combined-cycle power plant is smaller than that in a large steam power plant, more and more plants have come to be constructed with a series of multiple generator systems so as to realize higher output, as a whole, than the steam power plant. Since DSS (daily start & stop) operation is required in most of the thermal power plants these years, generators are supposed to be opened of their circuit synchronously during a time zone of lower power demand.

In order to open a generator circuit breaker synchronously, the generator is operated in a low load range just before just before the operation for opening the generator circuit breaker. During this period when the AC current amplitude is still small, if a short-circuit fault occurs in the main circuit of, for example, an adjacent generator system, the aforementioned phenomenon of no current through current zero occurs in this sound generator main circuit that is to be opened synchronously very soon. Since opening the generator circuit breaker synchronously during the phenomenon of no current through current zero is an OFF operation of the AC circuit breaker, it leads to an operation that DC current is shut down by force, resulting possibly in a serious problem that the mechanism etc. of the AC circuit breaker are damaged. The extent of damage depends upon various conditions, but the damaged circuit breaker will probably become no longer usable and there is a possibility of causing a fire in a certain case.

It may be possible in some cases to regard the above condition negligible since the probability of electrical fault occurrence in the generator main circuit is very low. However, for a plant equipped with a lot of generator systems and involved in frequent shut-down and synchronous opening of generator main circuit as explained above, the above condition means that the plant is subjected to the risk each time of the operation. Hence, for some plants, it cannot be a favorable condition.

Embodiments of the present invention are explained hereunder, with reference to the drawings.

Figure 11:
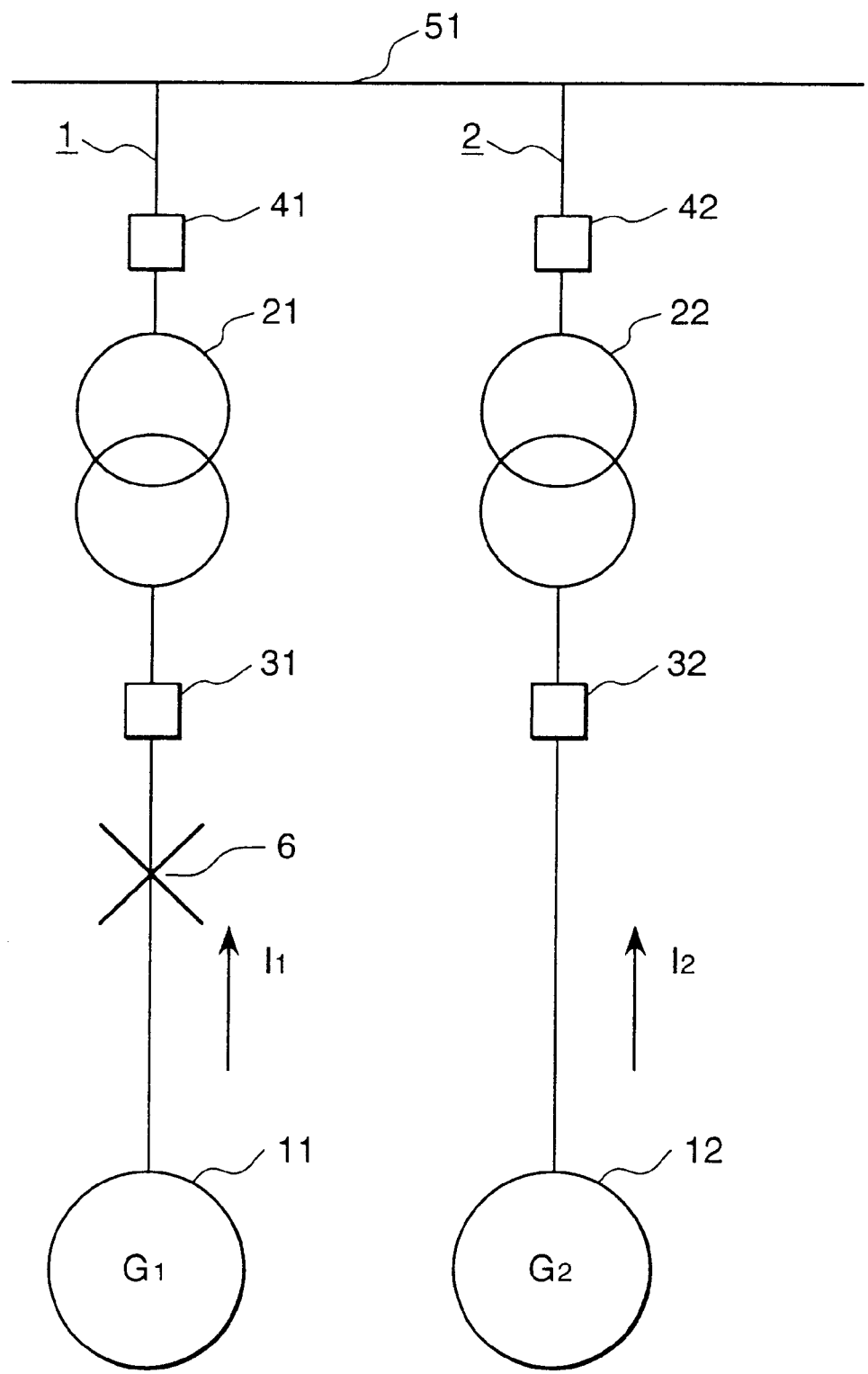
FIG. 11 is a diagram of a generator main circuit comprising multiple generator systems

FIG. 11 shows a generator main circuit comprising multiple generator systems. According to an embodiment shown in FIG. 11, there is constructed a #1 generator system 1, wherein a generator 11 is connected to a switch-yard bus bar 51 (transmission system) via a main transformer 21. Besides, a circuit breaker 31 connected to the primary and a circuit breaker 41 is connected to the secondary of the main transformer 21, respectively, and the circuit breaker 31 is connected to the generator 11 and the circuit breaker 41 is connected to the switch-yard bus bar 51, which are operated for closing or opening the power line circuit synchronously. Also connected to the switch-yard bus bar 51 is a #2 generator system 2 comprising a generator 12, main transformer 22, and circuit breakers 32 and 42 in the same manner as is the #1 generator system. In the figure, I1 represents the operating current of the generator 11 (G1) and I2 represents that of the generator 12 (G2). It must be noted that, in an embodiment shown in FIG. 11, power supply circuits inside the power station are omitted for the convenience of explanation. Besides, although the transformers 21 and 22 are in most cases formed in to a single unit of 3-wire transformer and, at the same time, the circuit breakers 41 and 42 on the high-voltage side of each transformer are formed rationally into a single unit, they are shown as they are also for the convenience of explanation.

The embodiment in FIG. 11 shows a condition that the generators 11 and 12 are in power generating operation via the main transformers 21 and 22 so as to transmit power to the switch-yard bus bar 51. It is assumed that an electrical fault (failure) occurs at a position 6, as shown in figure, in the generator main circuit during the operation. When a fault (failure) occurs suddenly at the point 6 on the line of the #1 generator system 1, and if it is a short-circuit between three phases, it happens that the line voltage is lost there and large accidental current is supplied from the generator 11. Although similar large current flows into there also from the system & main transformer side, there is normally provided, for preventing extension of an electrical fault, an automatic interface for shutting down the circuit breaker 31 or 41 installed to open the circuit synchronously, and the accidental current is shut down as this automatic interface functions.

The phenomenon occurring in the generator main circuit is explained hereunder on the basis of the above condition. In the explanation hereunder, a system with the generator 11 (G1) wherein an electrical fault occurs is called the faulty system and a system with the generator 12 (G2) which is operating soundly is called the sound system.

The electrical phenomenon pointed out in the aforementioned paper means that, when the sound generator system is to be opened of its circuit synchronously while it is under a small load, i.e. to be concrete, when the sound system has finished a generating operation and is about to be opened of its circuit synchronously, if an electrical fault is assumed to occur in the other generator main circuit, the waveform of the generator main circuit current of the sound system causes a phenomenon of no current through current zero occurs. This phenomenon does not occur in all systems having a construction shown in FIG. 11 but occurs depending upon the condition of circuit characteristics based on the specifications of the electrical devices and components on the same connection line, including the impedance of the generators 11 and 12 and the short-circuit capacity of other systems, not shown, after the switch yard. Of the circuit characteristic, the most direct and important parameter is the ratio of the time constant of two different lines at a branch point.

Figure 2:
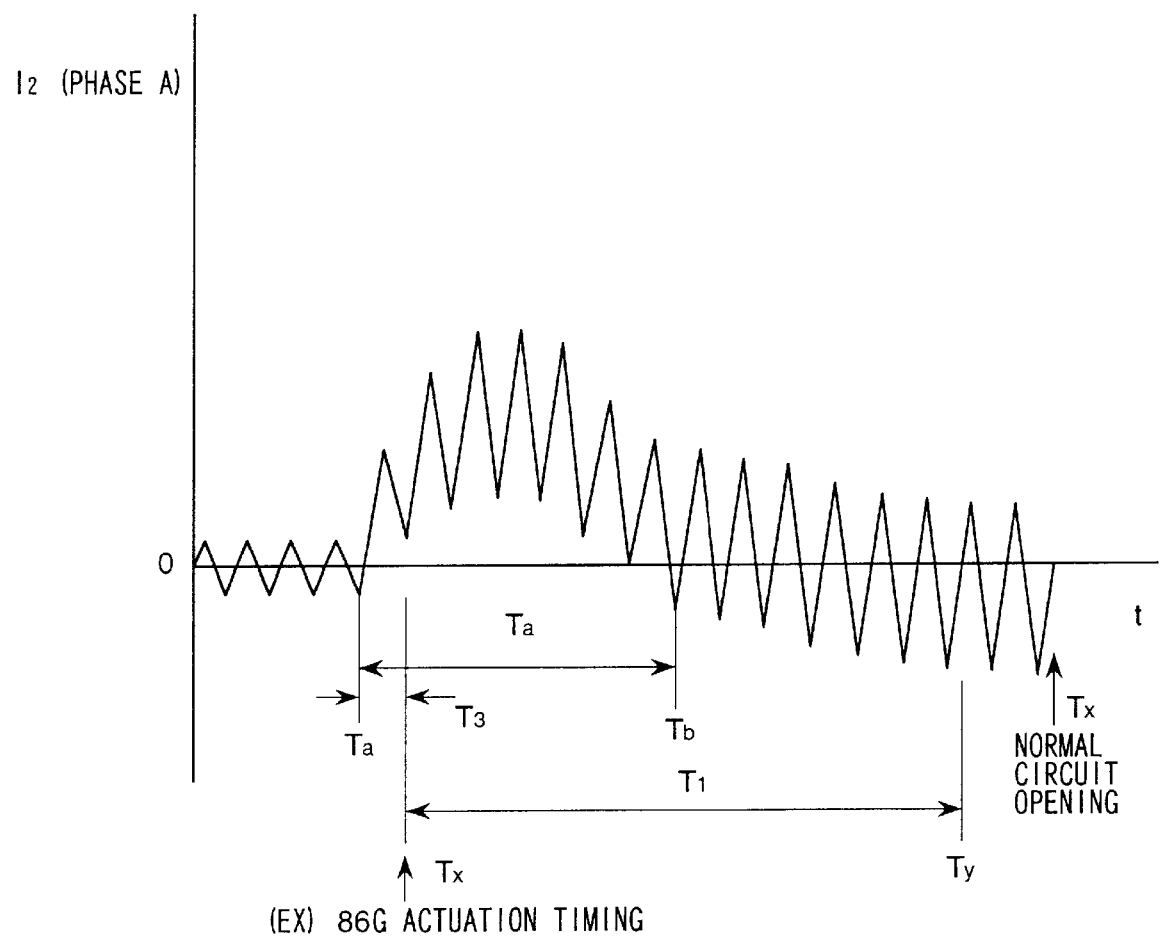
FIG. 2 is a chart of the relationship between low load range current I2 and time t.

FIG. 2 shows an observation result of the waveform of representative Phase A, one of the phases of the low-load range current I2 of the generator in the sound system under the same phenomenon. In the figure, the vertical axis represents current and the horizontal axis represents time. Shown in FIG. 2 is a condition that the waveform amplitude suddenly increases higher than a steady-state value at the time shown by Ta in the figure because the effect of a fault has propagated instantly from the faulty system and the phenomenon of no current through current zero has occurred, and then, after a duration T0 from Ta to Tb, the amplitude resumes a zero-cross.

The above will not result in a problem if the duration T0 is short enough. Depending upon the aforementioned circuit characteristics or the function and capacity of an automatic voltage regulator (AVR) of a generator, the duration T0 can be as long as in seconds. Here, other two phases do not always exhibit an equivalent waveform, depending upon the position of each phase at the timing 6 of occurrence of the fault. That is to say, since the circuit breaker is of 3-phase type, the similar phenomenon is possible to occur on any one of the phases.

Next, concerning the fist embodiment of the present invention shown in FIG. 1, steps from occurrence of an electrical fault up to generation of a circuit breaker OFF command signal in the control system in opening the generator main circuit of the sound system synchronously are explained hereunder. The embodiment in FIG. 1 has the same construction as shown in FIG. 11 except that current detectors (CT) 101, 111, 102, and 112 for measuring current of the generators 11 and 12 are added and that control and protection units 61 and 62, which process the detection signals 101a, 111a, 102a, and 112a detected by the above current detectors so as to use for controlling the circuit breakers 31, 32, 41, and 42 and for protecting the generators 11 and 12, are added. Control signals for the circuit breakers 31, 32, 41, and 42, which are to be controlled by the control and protection units 61 and 62, are shown by broken lines 61a and 62a.

In the embodiment constructed as above, it is assumed that an electrical fault occurs at a point 6 in the main circuit of the generator 11 and that the generator 12 of the sound system side is under a low load operation just before opening of the generator main circuit synchronously. Upon occurrence of an electrical fault, an accidental current is caused to flow from the generator 11 and also from the main transformer 21 side into the point 6. In this embodiment, therefore, the current detectors (CT) 101 and 111, detector for ratio differential protection relay are installed and a fault judgment is performed by the control and protection unit 61 according to the difference of current measured by the current detectors 101 and 111. If the control & protection unit 61 judges occurrence of a fault from the measurements of these current detectors, a circuit breaker opening command signal 31a for isolating the faulty point is sent from the control and protection unit 61 to the circuit breaker 31 and, when the circuit breaker 31 is opened, the line of the main circuit (generator system) on which the fault has been detected is shut down. Besides, when an electrical fault has been detected, the control and protection unit 61 sends a block signal 150, which is to block the circuit breaker 32 from opening a generator main circuit synchronously, to a control and protection unit of a generator in other sound systems than in the faulty generator system, that is, in the embodiment shown in FIG. 11, the control and protection unit 62 of the generator system with the sound generator 12, for a specified length of time after the occurrence of an electrical fault is detected by the control and protection unit 61.

On the other hand, in the control and protection unit 62, after receiving the block signal 150 from the control and protection unit 61, an interlock is formed by a circuit breaker operation circuit incorporated in the control and protection unit 62 so as to block the circuit breaker 32 from opening a generator main circuit synchronously for a specified length of time after the occurrence of an electrical fault is detected in other generator system.

While the explanation above covers an opening operation of the circuit breaker 32 of the #2 generator system 2 in case an electrical fault occurs in the #1 generator system 1, a block signal 150 is sent, in case an electrical fault occurs in the #2 generator system 2, from the control and protection unit 62 to the control and protection unit 61 in a similar manner as explained above. That is, the control and protection unit 61 is also equipped with an interlock circuit which sends a circuit breaker opening command signal 31a within a specified time after a command for opening the circuit breaker is sent so as to block the circuit breaker 31 from opening a generator main circuit synchronously for a specified length of time after the occurrence of an electrical fault is detected in other generator system.

In addition, while the explanation above intends to mean the circuit breakers 31 and 32 installed on the primary side are the circuit breakers to be opened synchronously, it is allowable to cause the circuit breakers 41 and 42 installed on the secondary side to be opened synchronously. When these circuit breakers 41 and 42 are to be opened synchronously, and if a block signal indicating the occurrence of an electrical fault has been sent, sending-out of the circuit breaker opening command signals 41*a* and 42*a* is controlled by force by an interlock circuit, which blocks sending-out of the circuit breaker opening command signals 41*a* and 42*a* for a specified length of time, so that the circuit breakers 41 and 42 should not be opened synchronously.

Next, a timer setting for blocking the circuit breaker of the sound system from opening a generator main circuit synchronously as sufficiently as possible during the duration T0 of the phenomenon of no current through current zero is explained, using FIG. 2. The figure shows an example wherein an output signal from a generator lock-out relay (86G) is utilized as a representative signal for detecting a fault within the shortest possible time after the occurrence. That is, the waveform of current I2 (Phase A) suddenly begins to increase higher than a steady-state value, starting from the time shown by Ta just after the occurrence of a short-circuit fault, and immediately at the time shown by Tx, actuation of the protection relays follows, and then the generator lock-out relay (86G) is actuated and the signal is used as a trigger signal for starting a counting operation of a timer. It is preferable that the timer setting T1, starting from the time Tx to a later time Ty set to a specified length, be set to a sufficiently enough length of time although too long a time as compared to the duration T0 of the phenomenon of no current through current zero is not needed. While the longer the timer setting T1 is, the more surely the generator main circuit can be protected, setting to 1.0 second or so will be able to cover almost all conditions in a practical operation.

The figure in which the start point Tx of the timer setting T1 crosses the time zone of the duration T0 of the phenomenon of no current through current zero is to show a fact quantitatively that, as explained above, the phenomenon occurs first and then, after some delay in time, a detection system begins to operate. This fact means, in other words, that, during the time difference T3 from the start of the duration T0 of the phenomenon to the start of the timer setting T1, it is impossible to shut down the DC current resulting from the on-going phenomenon of no current through current zero in the duration. However, since this time difference T3 is extremely short, this embodiment regards the time difference T3 negligible.

Since the generator lock-out signal covers not only an electrical fault inside a generator but a factor or element of the electrical fault, a phenomenon of no current through current zero may not occur in case of a generator trip fault resulting from a certain element. For this reason, it will be an idea to employ a specifically designed detection system effective for limited factors that cause a phenomenon of no current through current zero. With this limitation to specific factors, it is possible to further shorten the time difference from the start of the occurrence of a phenomenon to the start of the generation of a lock-out relay actuation signal. Since, however, the circuit construction becomes complicated and the number of generator systems concerned increases as a result, it is likely to happen that the overall reliability of the circuit may deteriorate because of restriction to the number of required contacts or other reason. Besides, it is also important to take into account future necessity for examining the transmission line characteristic so as to meet changes in the transmission operation including future increase of decrease of the short-circuit capacity of a system. Thus, necessary actions for optimizing a system shall be taken on a case-by-case basis.

Figure 3:
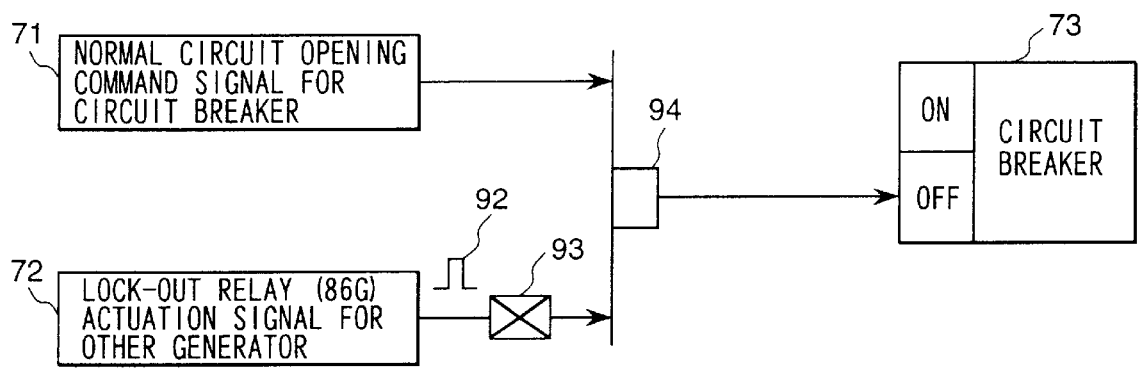
FIG. 3 is a logic diagram of an interlock according to an embodiment of the present invention.
Figure 3:
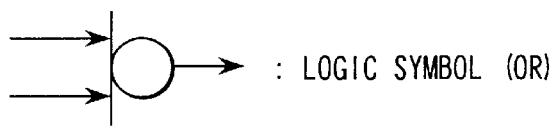
Figure 3:
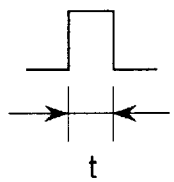
Figure 3:
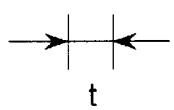
Figure 3:
Figure 3:
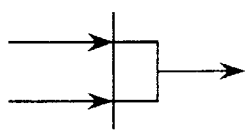

FIG. 3 shows an example of an interlock logic for the circuit breakers 31, 32, 41, 42, etc. that are to be installed as counter measures based on the above conception. The logic is for a construction wherein a circuit breaker is installed on the low-voltage side of a main transformer. Assuming that an accidental current can be shut down within the capacity of the circuit breaker shown, the circuit breaker 73 in FIG. 3, which is to receive a circuit breaker OFF signal, represents the same device as the circuit breaker 31 shown in FIG. 1. In FIG. 3, notation 92 is a one-shot timer for outputting an ON signal during a specified length of time "t", notation 93 is a logic symbol representing "NOT", and notation 94 is a logic symbol representing "AND".

If a detection signal of the occurrence of an electrical fault in other generator system, for example, a lock-out relay (86G) actuation signal for other generator system is not output while a synchronous circuit breaker opening signal 71 is input to the control unit in order to shut down the circuit breaker 73, the condition of a command for opening the circuit breaker 73 synchronously is met, and accordingly the circuit breaker 73 is opened to "OFF" synchronously. If a lock-out relay (86G) actuation signal for other generator system is detected, the actuation signal output is used for the one-shot timer 92 as an output corresponding to the aforementioned timer setting T1, and while there remains a bit signal that holds true only for a length of time of the timer setting, the last stage is blocked from outputting a synchronous circuit opening signal.

As explained above, if a synchronous circuit opening command is sent immediately after the lock-out relay (86G) is actuated, outputting the synchronous circuit breaker opening signal 71 can be suspended for a length of time of the timer setting T1 by causing the one-shot timer 92 to retain the output of the synchronous circuit breaker opening signal 71 for a specified length of time. As a result, even if a phenomenon of no current through current zero has occurred on the sound generator system to be opened of its circuit synchronously, the sound generator system can be opened of its circuit more safely without giving damage to devices and components. Particularly in a combined-cycle power plant equipped with multiple generator systems and involved in frequent shut-down and synchronous circuit breaker opening, the generator main circuit can be surely protected at each synchronous circuit breaker opening.

Figure 4:
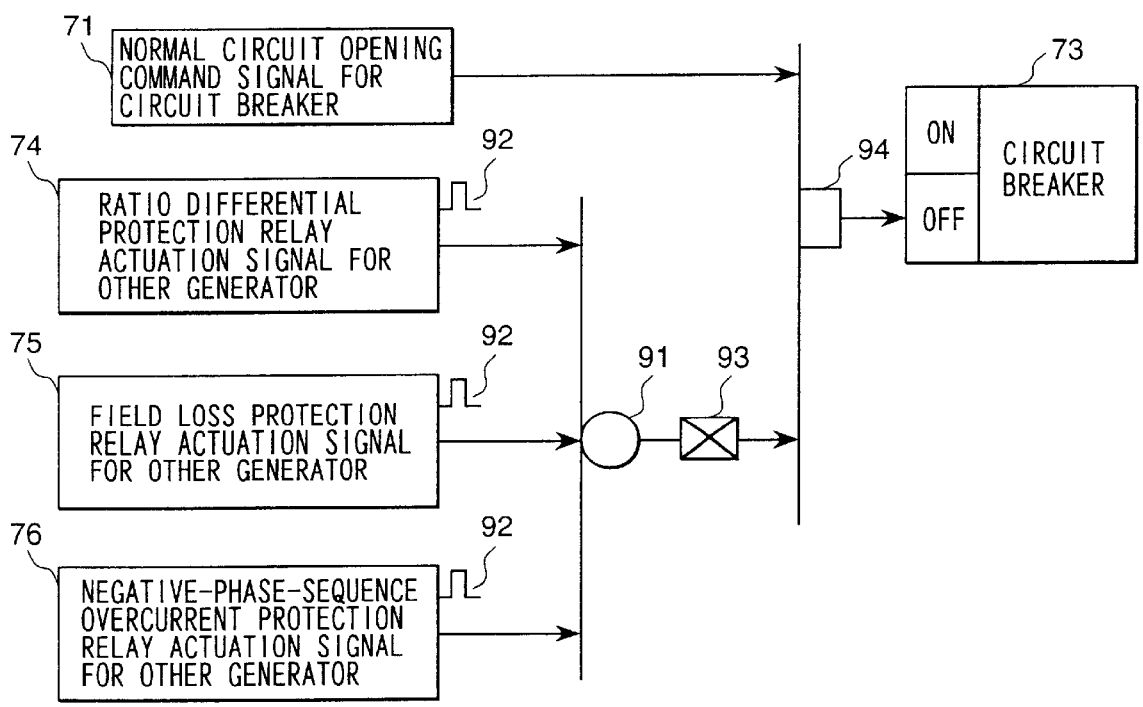
FIG. 4 is a logic diagram of an interlock according to an embodiment of the present invention.

FIG. 4 shows another example of a system wherein multiple block signals for blocking the synchronous circuit breaker opening are employed. The source of the signals 74 to 76 shown in the figure are the signals sent from other generator systems. Similarly, this construction will essentially apply to a system that employs a specific signal based on individual factor of a fault. For example, provided that there are three identifiable elements as the occurrence factors of the phenomenon of no current through current zero, it is possible to design a system utilizing the representative signals of the elements; a ratio differential protection relay actuation signal 74 for other generator, a field loss protection relay actuation signal 75 for other generator, and a negative-phase-sequence overcurrent protection relay actuation signal 76 for other generator. In an interlock circuit shown in FIG. 4, if a synchronous circuit breaker opening command signal 71 is output while any one of the protection relay actuation signals 74 to 76 is output, the output of the synchronous circuit breaker opening command signal 71 is retained for a specified length of time by the one-shot timer 92.

Though it is necessary to satisfy a precondition that the synchronous circuit breaker opening command signal 71 is longer than the length of time while a condition for blocking the synchronous circuit breaker opening holds true, detail of such logic is not explained here because it is a subject for coordination of the control circuit.

In the first embodiment explained above, the control is improved by delaying the timing of operating the circuit breaker to be opened synchronously so as to avoid as much synchronism as possible. The duration of the phenomenon of no current through current zero is estimated and defined in advance and, assuming that the duration is shorter than the order of second, synchronous circuit breaker opening is inhibited or blocked during the duration. An assumption that the duration is shorter than the order of second is based on a view point that the impact of the phenomenon on the shut-down process of an entire plant is smaller in terms of time. Since interlocking measures are needed in case the above holds true, the control can be realized using a logic circuit combining the functions of timers and relays.

From a view point of direct effect, the embodiment can prevent so-called DC shut-down because a generator is opened of its circuit synchronously in expectation of the timing and time when the current waveform has returned to current zero. This idea itself for delaying the time is very common measures, but an engineering examination is yet to be given as to what signals should be used. Using representative signals closely related to the trip action in an electrical fault, including a signal of a detection element of an electrical fault in a generator main circuit or a signal of a generator lock-out relay, the measures are taken as precisely as possible.

Next, the second embodiment of the present invention is explained hereunder.

Figure 5:
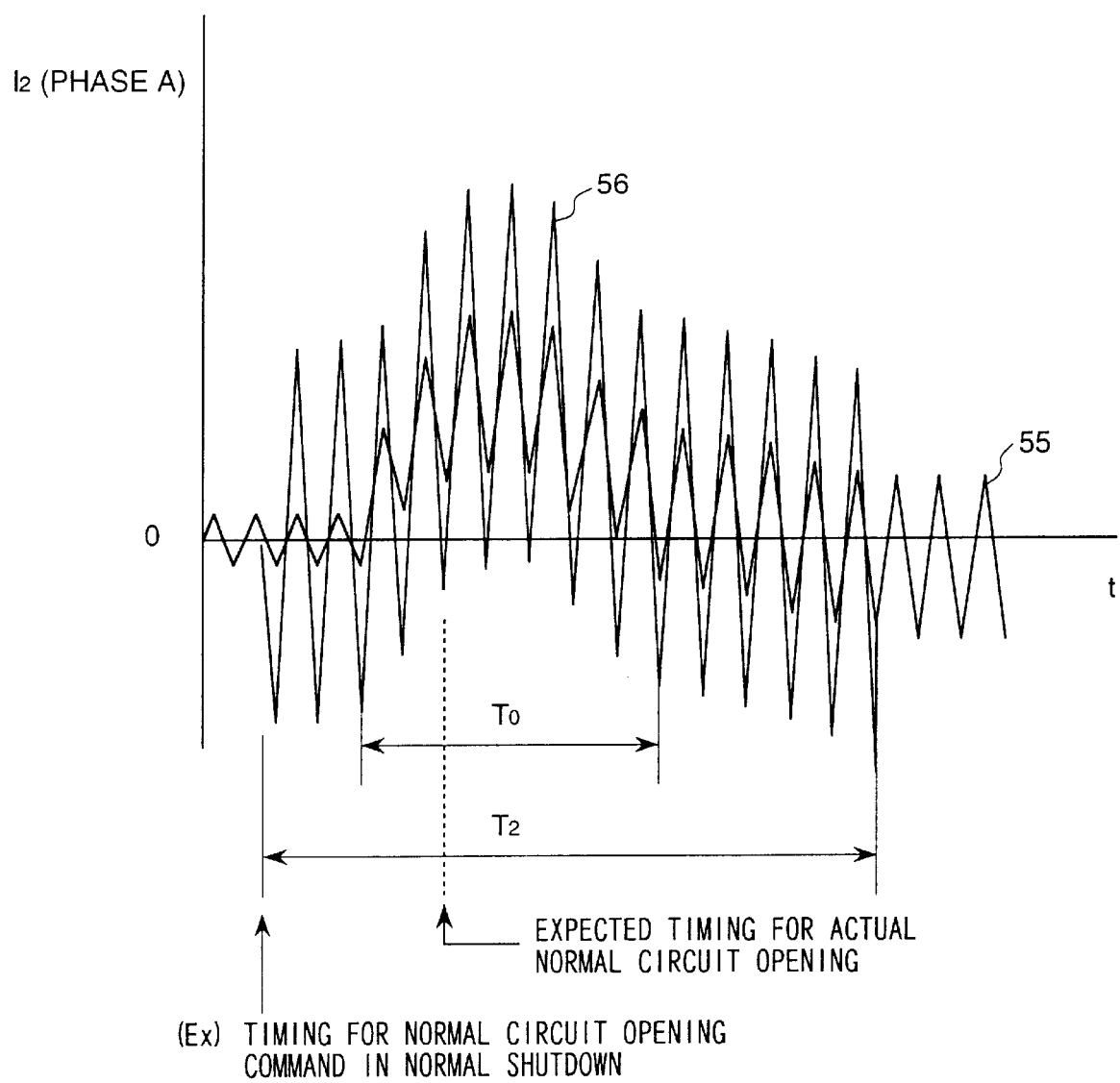
FIG. 5 is a chart of the relationship between low load range current I2 and time t.

FIG. 5 is a chart shown in FIG. 2 on which a current amplitude waveform with enlarged current amplitude is superimposed. That is, it is a normal practice that the generation output of a generator system to be opened of its circuit synchronously is decreased. It is a normal operation in the shut-down process of a power plant in connection to the effective power. Here, in this embodiment, with an attention being paid on the reactive power of a generator, a control method for intentionally increasing the AC current waveform amplitude of a generator is performed without giving a big impact on a conventional principal plant shut-down operation. For this purpose, it is needed to operate the field current of the generator and the operating voltage is set a little higher.

That is, when a circuit breaker installed on the sound generator system is to be opened synchronously, the amplitude of AC current waveform of the generator output is amplified in synchronism or in advance of the timing for opening the circuit breaker synchronously so that the AC current passes through current zero. In this amplitude control of AC current waveform, the AC current waveform can be amplified to any desired amplitude by operating the field current (load command value) of the generator as explained later. Here, in the field current control of the generator, it is desirous that the generator load of the generator system to be opened of its circuit is set to the field current equivalent to a load command value needed for passing the current amplitude through current zero even under the phenomenon of no current through current zero.

Consequently, as shown in FIG. 5, by increasing the amplitude of the AC current waveform shown by a solid line 55 to the one shown by a bold line 56, it becomes possible to maintain the amplitude on the zero-cross and start opening the circuit breaker synchronously without concerning about DC shut-down. Since the field current is set and changed beforehand in this embodiment, correlation between the duration T0 of the occurrence of a phenomenon of no current through current zero and the amplitude increasing time T2 of the AC current waveform is such that T0 always include T2. As a result, because the expected timing in an actual synchronous opening of the circuit breaker can eliminate the time difference T3 in the first embodiment shown in FIG. 2, it becomes possible to protect the generator main circuit more surely from the phenomenon of no current through current zero.

Figure 6:
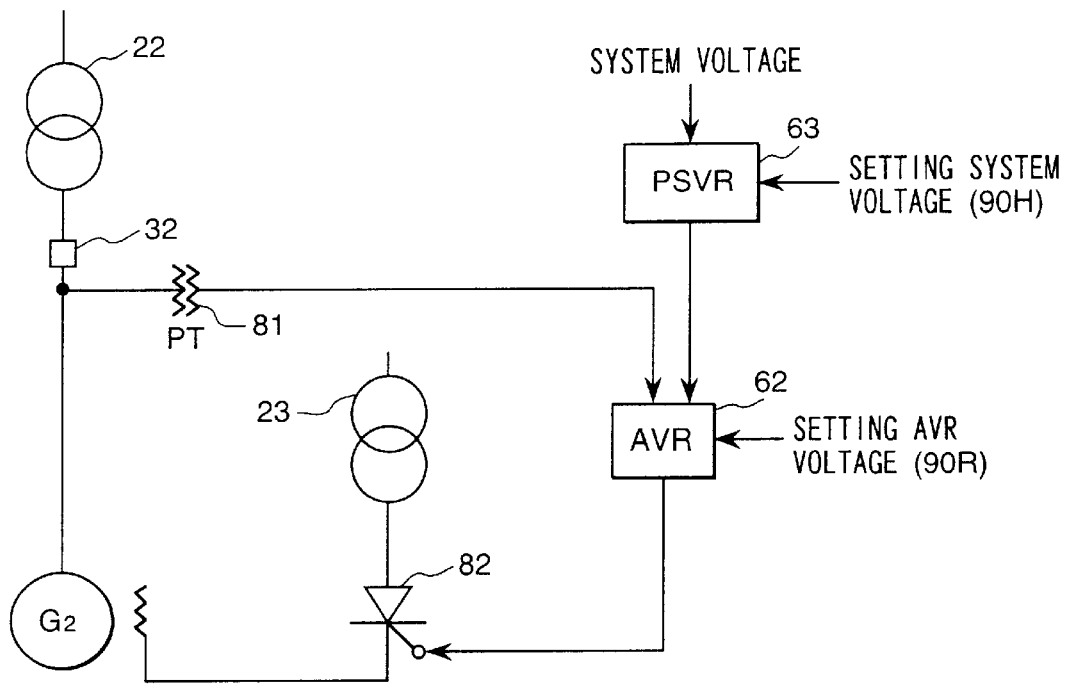
FIG. 6 is a schematic diagram of a generator main circuit of the embodiment.

FIG. 6 shows part of the construction of the generator main circuit in this embodiment. Basic function of the automatic voltage regulator (AVR) 63 for regulating the generator voltage is to control the terminal voltage of the generator constant. An exciting power supply circuit controlled by the automatic voltage regulator, in case of a thyristor self-exciting method, normally converts the AC power from an exciting transformer 23 into a DC current by a thyristor rectifier 82 and, while the output current is determined in this conversion process, operates in accordance with a command signal from the AVR 63.

Figure 7:
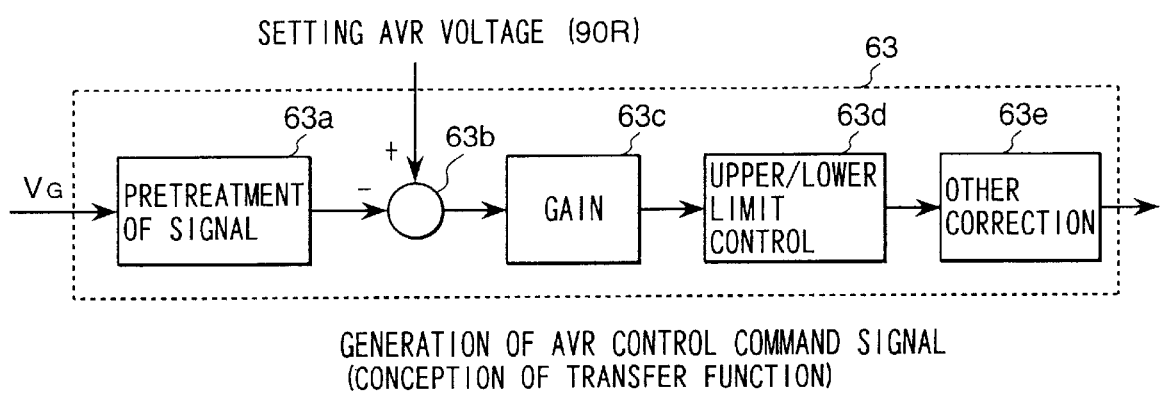
FIG. 7 is a brief schematic diagram of transfer function of an AVR control.

FIG. 7 shows a schematic diagram of the transfer functions relating to the control by the AVR 63. In this diagram, the generator voltage is input from a voltage detector 81 as a measured value VG, and the quantity of state of the generator voltage is input as an input signal. Besides, the AVR voltage setting (normally called "90R") for providing a control target signal of the generator voltage is used as a reference value, and a deviation 63b between this reference value and the quantity of state of the generator voltage (VG) after a signal pretreatment 63a is calculated. Then, a gain 63c is determined in order to so control the generator voltage as to eliminate the deviation between the target value and the quantity of state, and a control signal is generated via a correction term 63e within a range specified in an upper/lower limit control 63b. In this embodiment, as explained above, the reactive power is increased by raising the AVR voltage setting as a target value temporarily in the AVR voltage setting (90R) which is a section indicating a reference value inside the transfer function shown in FIG. 7. As a result, since the AC current amplitude waveform of the generator is amplified as shown in FIG. 5 and the amplitude of the AC current is caused to pass through current zero, it becomes possible to protect the generator main circuit from the phenomenon of no current through current zero surely.

Figure 8:
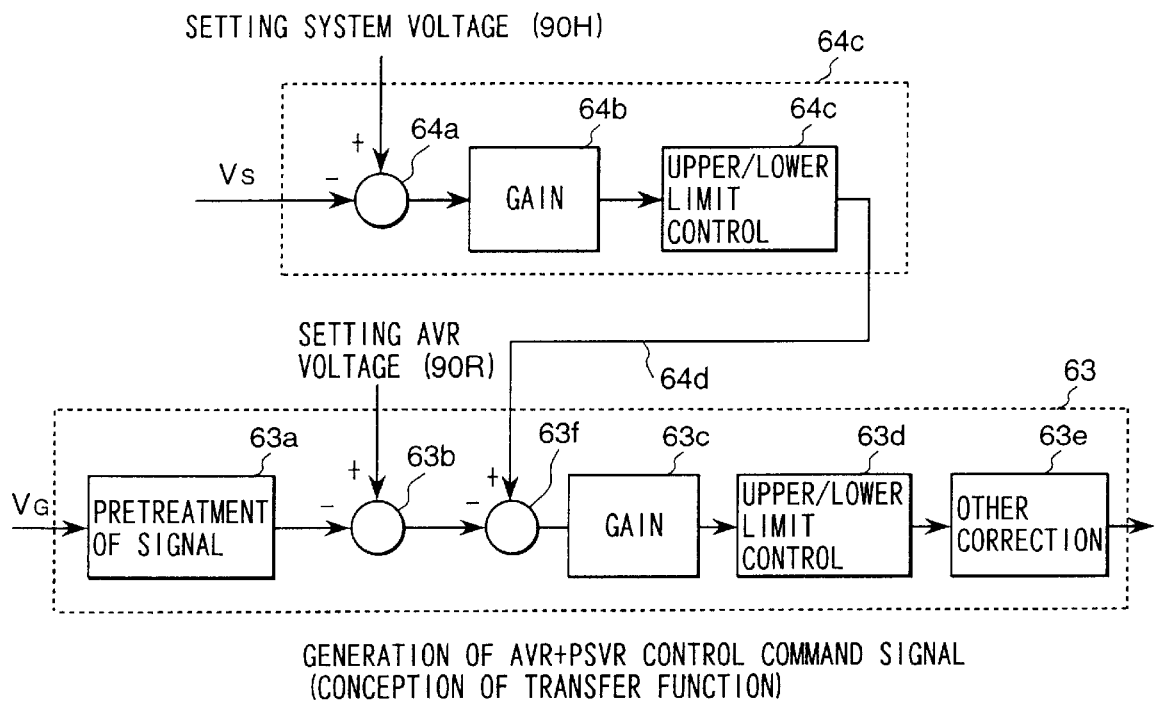
FIG. 8 is a brief schematic diagram of transfer function of a PSVR control.

FIG. 8 shows a schematic diagram of a transfer function for PSVR control which is added to part of the AVR function shown in FIG. 7. That is, the schematic diagram in FIG. 8 explains the control by a power system voltage regulator (so-called PSVR) 64, which has a function of generating a target reference signal for the system voltage setting (called "90H") for the purpose of controlling the system voltage.

In the embodiment shown in FIG. 8, a control command signal for the output current of the thyristor rectifier 82 is so generated as to control the output signal of the system voltage regulator in case that the automatic voltage regulator (AVR) and the power system voltage regulator (PSVR) 64, both shown in FIG. 6, are in cooperative operation. Here, a system voltage VS detected by a detector, not shown, is input to the power system voltage regulator (PSVR) and a deviation 64a between the voltage and the reference value in the system voltage setting (90H) that provides a control target signal of the system voltage is calculated. Then, a gain 64b is calculated so as to minimize the deviation between voltage and the reference value of the system voltage setting (90H), and a control command signal 64d for the system voltage VS is output within a range specified in an upper/lower limit control.

The control command signal output from the power system voltage regulator (PSVR) 64 is input to the automatic voltage regulator (AVR) 63 as shown in FIG. 6 and FIG. 8. For this control command signal, a deviation between the deviation signal calculated by the deviation 63b and the control command signal 64d is calculated again to obtain a deviation 63f, and a gain 63c is calculated in accordance with this deviation signal.

This process is to control the variation of the system voltage within the upper/lower limit of the generator voltage, and does not remarkably affect the time of the phenomenon of no current through current zero, a main subject of this embodiment, because the cycle of arithmetic control is long enough, but still slightly affects the initial condition and others. For this reason, in order not to offset the effects of the operation each other during the raising process of the reactive power, this control is performed by inhibiting a function temporarily.

Figure 9:
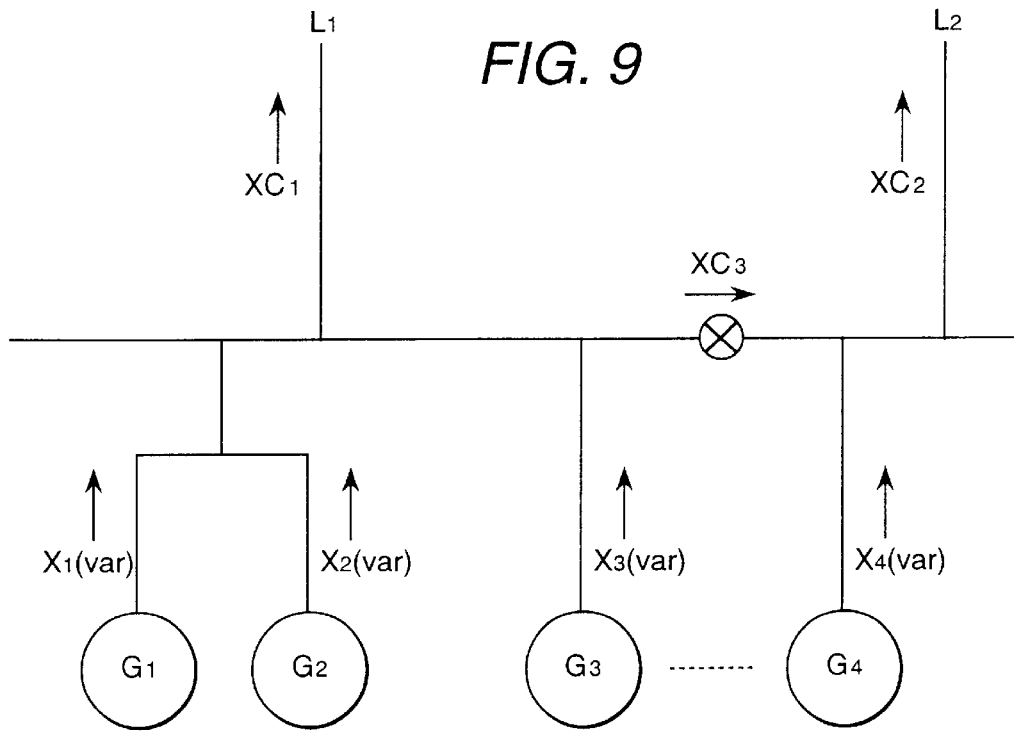
FIG. 9 is a diagram of power flow.

Since it is understood that how this exciting current control be performed determines the operating condition concerning the reactive power in normal control of a generator system, some power stations may be provided with a control mechanism that manages the supply reactive power to the system of each generator system shown in FIG. 9 overall. That is, the power flow is monitored at X1, X2, X3, and X4 and also at XC1, XC2, and XC3 as shown in the figure so as to control the reactive power sent to the transmission line by controlling the flow in accordance with an operational intention, such as for increasing or decreasing the voltage at the destination of transmission.

Figure 10:
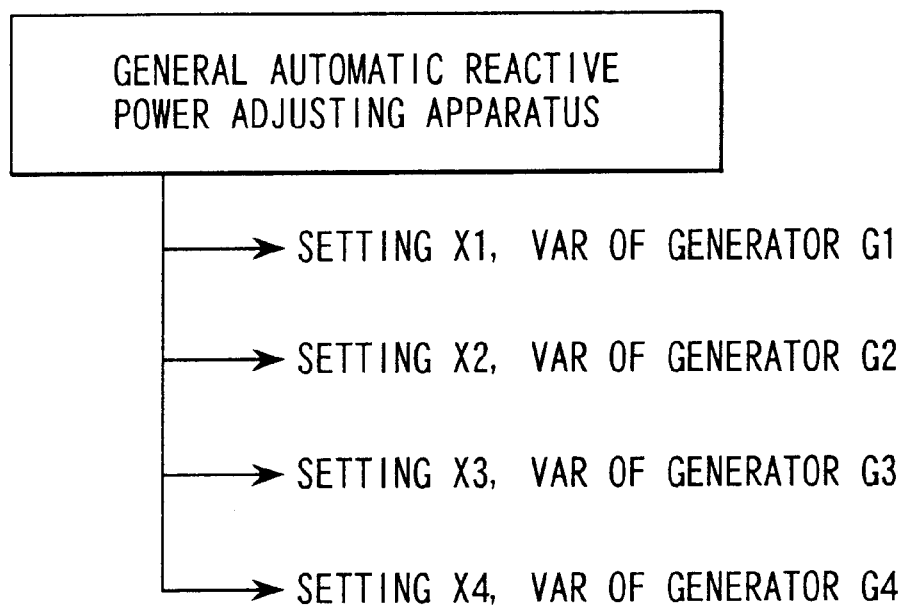
FIG. 10 is a diagram showing an overall reactive power control.

This control is to generalize each generator system into an overall function. Thus, it is possible to plan and achieve an operation that does not cause imbalance of the supply in a long run by detecting the temporarily increased reactive power individually from the above-mentioned generator system to be opened of its circuit synchronously, and lowering the supply reactive power from other generator system. FIG. 10 shows an example of control concept related to this overall reactive power control. Here, when XC3≠0,a command value for each output X1, X2, X3, and X4 is determined in order to achieve the specified XC1 and XC2 (=X2). Then, the equations shown as condition 1 (XC1+XC3=X1, X2, X3) and condition 2 (XC2−XC3=XC4) in the figure are derived from the connection construction of the system, and they are used as the set limit of the reactive power var of individual generator system, which can be set optionally within an allowable range of the generator. For a concrete example, provided that XC1, XC2, and XC3 are known value, when X1=X2=X3=(XC1+XC3)/3 is applied during a normal operation and the generator system to be opened of its circuit synchronously is set to G2, the reactive power quantity, which is a product of an increase of the reactive power at the time of opening the generator circuit breaker synchronously and a required time, is divided to X1 and X2 to keep the plant in balance.

The control mechanism of the above AVR or PSVR is normally provided with an alarm for excessive excitation, insufficient excitation and abnormal voltage. In this embodiment, however, an abnormal voltage alarm that directly relates to the expected voltage increasing operation is not provided unless specifically required but a countermeasure for prohibiting an output will be taken in advance, because it is an intentional voltage increasing operation and the duration can be made shorter than a second. To be concrete, an interlock that does not allow to output a high voltage alarm while the voltage setting is increased will be incorporated.

Next, when a circuit breaker applicable to opening the generator main circuit synchronously in FIG. 1 has a construction of the circuit breaker 32 or circuit breaker 42, although synchronous opening of the generator main circuit is to be performed by the circuit breaker 32 on the low-voltage side of the main transformer under a normal operation, the circuit breaker 42 on the high-voltage side of the main transformer is opened for the purpose if a phenomenon of no current through current zero is caused on the circuit breaker 32 by an effect from the generator system under an electrical fault and if a signal for opening the circuit breaker is received. The above case includes an operation of shutting down both circuit breakers 32 and 42 almost simultaneously. Why the two are shut down almost simultaneously is because such a case is considered that the operation timing of the fault detection circuit on the faulty system is delayed from that of the low-voltage side circuit breaker under normal opening of generator main circuit. It is a background of this operation that, when the circuit breaker on the high-voltage side of the main transformer is to be opened synchronously, a phenomenon of no current through current zero changes its characteristic and becomes harder to occur in the waveform of the high-voltage side than in the waveform of the low-voltage side. Here, if a branch line for in-house power supply is taken out from the low-voltage side of the main circuit, opening the circuit breaker on the high-voltage side synchronously means temporary loss of the in-house power supply, so it is preferable from a stand point of operation that this operation should be limited to a case where in-house power supply is received from other power supply system.

Next, to explain the condition of human interface in an actual operation, how to output alarms is explained hereunder.

Particularly, since a method for increasing the reactive power temporarily involves an increase of voltage, in a very short period through, it is desirous that an advance voice notification of, for example, "Reactive Power Increase, Normal Circuit Opening" be known sufficiently to the operators involved in a power station. In practice, in consideration of the present status of voice notification, it may be possible to add the above to an existing notification of "Generator Main Circuit Opening", or cause an alarm sound, or light or flicker a visible indication lamp.

In managing the increase of the reactive power, a control system shall be so designed as to be able to make necessary modification based on the result of experiences for a length of time since it may be needed to change a preset increment of the current amplitude depending upon an actual increase of voltage attained according to an initial setting, to further increase the current amplitude, or to decrease the amplitude so as to eliminate too much allowance.

According to the method above, it becomes possible to take appropriate measures in coping with such phenomena, leading to a hazardous operation range at the time of opening generator circuit breaker synchronously, that relates to synchronous opening of generator main circuit under a phenomenon of no current through current zero which was not recognized in conventional normal operation of the generator circuit opening control in each power station or against which no measures could have been made to the end. It becomes also possible to provide a power station with a safe operation method, and in a long run, the overall operation efficiency improves in wider area.

This method, particularly relating to a fundamental issue about a major power supply system of a generator main circuit, is convenient in view of stable supply of power as it takes into account not only the meaning of generator main circuit protection but also the soundness of a power train of turbines and generators and auxiliary devices up until the next start-up, although the above is based on the result of calculation and analysis.

As explained above, the second embodiment employs, as a positive means for eliminating current zero, a method of taking necessary measures for eliminating current zero at the time of opening a generator that needs to be opened of its circuit. That is, the waveform amplitude of a generator current is intentionally increased and consequently a phenomenon of no current through current zero is eliminated either by performing a rapid circuit opening (load shutdown) from a high load (effective power load) range or by increasing the reactive power, wherein the effective power is small though. Since the current amplitude is sufficiently big in this method, and accordingly the quantity of state of the current is so operated that the phenomenon of no current through current zero always crosses current zero, there will be no obstacle in opening an AC circuit breaker synchronously.

Besides, increasing the generator voltage setting as a method of increasing the reactive power is an issue as to what is to be operated at the beginning of the process for increasing the current amplitude as a result of increasing the above reactive power. That is, since the generator voltage and the reactive power output, both within a normal controllable range, are in an almost linear correlation, there is a characteristic that the reactive power is increased as the voltage setting is increased. An operation for increasing the voltage setting is to increase the reactive power, making use of this characteristic.

The present invention produces an effect of being able to provide a method of synchronous circuit opening of generator circuit breaker and its control apparatus that can protect a generator main circuit from a phenomenon that current may not pass through current zero for many cycles at the time of opening a generator main circuit synchronously.

What is claimed is:

1. A method of synchronous circuit opening of a generator circuit breaker for a generator main circuit in which multiple generators are connected to a transmission system via circuit breakers so that a circuit breaker can be closed or opened synchronously; wherein, at the time when a circuit breaker installed in a generator main circuit is to be opened synchronously, if an electric signal for judging occurrence of an electrical fault in other generator main circuit is detected, opening of the circuit breaker synchronously is suspended for a specified length of time after the electric signal is detected.

2. A method of synchronous circuit opening of a generator circuit breaker according to claim 1; wherein occurrence of an electrical fault in other generator main circuit is detected using, as an electric signal for judging occurrence of an electrical fault, an output from a protection relay element serving for short-circuit protection of the portions of the same potential as the generator main circuit voltage, from each element of generator protection relay group, or from a generator lock-out relay.

3. A method of synchronous circuit opening of a generator circuit breaker according to claim 1; wherein there are provided a circuit breaker on both high-voltage side and low-voltage side of a transformer for increasing the generator voltage, and, at the time when a generator main circuit is to be opened synchronously, if a signal of an electrical fault occurrence in other generator main circuit is output, an operation command signal for opening the high-voltage side circuit breaker or simultaneously both high-voltage side and low-voltage side circuit breakers of the generator main circuit to be opened synchronously is output.

4. A method of synchronous circuit opening of a generator circuit breaker for a generator main circuit comprising multiple generator systems in which a generator is connected to a transmission system via circuit breakers; wherein, at the time when occurrence of an electrical fault in the multiple generator systems is detected and any one of the generator systems is to be opened of its circuit synchronously using the circuit breaker installed for the generator system, if occurrence of an electrical fault is detected in other generator system than the above generator system to be opened of its circuit synchronously, a synchronous circuit breaker opening signal for the generator system to be opened of its circuit synchronously is kept as non-output for a specified length of time after the occurrence of an electrical fault is detected.

5. A control apparatus for synchronous circuit opening of a generator circuit breaker for a generator main circuit comprising multiple generator systems in which a generator is connected to a transmission system via circuit breakers; said multiple generator systems comprising a detecting apparatus for detecting occurrence of an electrical fault and a protection relay for shutting down the circuit breakers in case of an electrical fault; wherein, said control apparatus for synchronous circuit opening is provided with an interlock circuit which, at the time when a synchronous circuit opening command signal of a circuit breaker installed in a generator system is to be output, if an actuation signal of a protection relay installed in other generator system is output, suspends output of the synchronous circuit opening command signal for a specified length of time after the actuation signal is output.

6. A control apparatus for synchronous circuit opening of a generator circuit breaker according to claim 5; wherein the above-mentioned multiple generator systems are provided with a transformer for increasing the generator voltage and there are provided the above-mentioned circuit breaker on both high-voltage side and low-voltage side of the transformer; and, at the time when a generator main circuit is to be opened synchronously, if a signal of an electrical fault occurrence in other generator main circuit is output, an operation command signal for opening the high-voltage side circuit breaker or simultaneously both high-voltage side and low-voltage side circuit breakers of the generator main circuit to be opened synchronously is output by said control apparatus for synchronous circuit opening.

7. A control apparatus for synchronous circuit opening of a generator circuit breaker for a generator main circuit comprising multiple generator systems in which a generator is connected to a transmission system via circuit breakers;

said multiple generator systems comprising #1 and #2 current detectors which detect current of the generator systems and a protection relay which shuts down the circuit breakers installed in the generator systems if the difference of current or ratio of the difference of current detected by the #1 and #2 current detectors exceeds a preset value; wherein
at the time when a circuit breaker installed in a generator system is to be opened synchronously, a synchronous circuit opening command signal of the circuit breaker is output by said control apparatus for synchronous circuit opening on condition that an actuation signal of the protection relay installed in other generator system is not being output.

8. A method of synchronous circuit opening of a generator circuit breaker for a generator main circuit in which multiple generators are connected to a transmission system via circuit breakers so that a circuit breaker can be closed or opened synchronously; wherein,
at the time when a circuit breaker installed in a generator main circuit is to be opened synchronously, the amplitude of AC current waveform of the generator output is amplified before the circuit breaker is opened synchronously so that the AC current reaches current zero, and then the circuit breaker is opened synchronously.

9. A method of synchronous circuit opening of a generator circuit breaker according to claim 8; wherein
when a phenomenon that current may not pass through current zero for many cycles (hereinafter called a phenomenon of no current through current zero) occurs, a load command value for a generator to be opened of its circuit synchronously is set to a value equivalent to a generator load at which AC current can reach current zero.

10. A method of synchronous circuit opening of a generator circuit breaker according to claim 8; wherein
when a phenomenon of no current through current zero occurs, a load command value for a generator to be opened of its circuit synchronously is set to a value equivalent to a reactive power load at which AC current can reach current zero.

11. A method of synchronous circuit opening of a generator circuit breaker according to claim 8; wherein
when a phenomenon of no current through current zero occurs, a voltage setting for a generator to be opened of its circuit synchronously is increased to a setting that corresponds to a reactive power at which AC current can reach current zero and a voltage setting for other generators not to be opened of their circuit synchronously is decreased to a setting that corresponds to the above-mentioned increased reactive power of the generator to be opened of its circuit synchronously so as to regulate the reactive power distribution of each generator.

12. A method of synchronous circuit opening of a generator circuit breaker according to claim 8; wherein
there are provided a generator voltage regulating apparatus and a system voltage controlling apparatus and, when the generator voltage regulating apparatus and the system voltage controlling device are in cooperative operation, the output signal of the system voltage controlling apparatus is inhibited.

13. A method of synchronous circuit opening of a generator circuit breaker for a generator main circuit comprising multiple generator system in which a generator is connected to a transmission system via circuit breakers; wherein,
at the time when any one of the multiple generator systems is to be opened of its circuit synchronously, if occurrence of an electrical fault in other generator system than the above generator system to be opened of its circuit synchronously is detected, the circuit breaker installed in the generator system to be opened of its circuit synchronously is opened synchronously with priority, and the amplitude of AC current waveform of the generator output of the generator system to be opened of its circuit reaches current zero, and then the circuit breaker is opened synchronously.

14. A control apparatus for synchronous circuit opening of a generator circuit breaker for a generator main circuit comprising multiple generator systems in which a generator is connected to a transmission system via circuit breakers; wherein
at the time when a circuit breaker of a generator system to be opened of its circuit synchronously out of the multiple generator systems is to be opened synchronously, the amplitude of AC current waveform of the generator output is amplified by said control apparatus for synchronous circuit opening before the circuit breaker is opened synchronously so that the AC current reaches current zero, and then the circuit breaker is opened synchronously.

15. A control apparatus for synchronous circuit opening of a generator circuit breaker according to claim 14; wherein
when a phenomenon of no current through current zero occurs, a voltage setting for a generator to be opened of its circuit synchronously is increased to a setting that corresponds to a reactive power at which current amplitude can reach current zero and a voltage setting for other generators not to be opened of their circuit synchronously is decreased to a setting that corresponds to the above-mentioned increased reactive power of the generator to be opened of its circuit synchronously so as to regulate the reactive power distribution of each generator.

* * * * *